United States Patent
Circosta

(10) Patent No.: US 10,898,782 B2
(45) Date of Patent: Jan. 26, 2021

(54) CONTROL SYSTEM FOR PITCHING MACHINE

(71) Applicant: Michael Circosta, Brooklyn, NY (US)

(72) Inventor: Michael Circosta, Brooklyn, NY (US)

(*) Notice: Subject to any disclaimer, the term of this patent is extended or adjusted under 35 U.S.C. 154(b) by 382 days.

(21) Appl. No.: 16/010,699

(22) Filed: Jun. 18, 2018

(65) Prior Publication Data

US 2019/0381383 A1 Dec. 19, 2019

(51) Int. Cl.
- *G05B 13/04* (2006.01)
- *A63B 69/40* (2006.01)
- *A63B 69/00* (2006.01)
- *G05B 19/042* (2006.01)

(52) U.S. Cl.
CPC ........ *A63B 69/408* (2013.01); *A63B 69/0002* (2013.01); *G05B 19/042* (2013.01); *A63B 2069/0008* (2013.01); *A63B 2225/093* (2013.01); *A63B 2225/50* (2013.01); *G05B 2219/25065* (2013.01)

(58) Field of Classification Search
CPC .............. A63B 69/408; A63B 69/0002; A63B 2069/0008; A63B 2225/50; A63B 2225/093; A63B 2220/10; A63B 2071/0675; G05B 19/042; G05B 2219/25065; G05B 19/0426; Y10T 29/53039

USPC ...................................... 700/100; 124/34, 36
See application file for complete search history.

(56) References Cited

U.S. PATENT DOCUMENTS

| | | | |
|---|---|---|---|
| 3,757,759 A | 9/1973 | Haworth | |
| 4,409,953 A * | 10/1983 | Kennedy | A63B 69/408 124/36 |
| 6,637,418 B1 * | 10/2003 | Suba | A63B 69/0002 124/34 |
| 6,820,605 B1 * | 11/2004 | Suba | A63B 69/408 124/34 |
| 8,622,049 B1 | 1/2014 | Frankenberg | |

* cited by examiner

*Primary Examiner* — Donghai D Nguyen
(74) *Attorney, Agent, or Firm* — Rankin, Hill & Clark LLP

(57) ABSTRACT

A control system for controlling a pitch parameter includes a controller, at least one pitch parameter adjustment actuator configured to mount to a pitching machine and cooperate with a component of or operatively connected to an arm assembly to adjust at least one pitch parameter, and at least one position tracking linear scale configured to mount the pitching machine. The at least one pitch parameter adjustment actuator is electrically operated and actuated by the controller. The at least one position tracking linear scale is electrically operated and communicates location data associated with movement of the component to the controller.

14 Claims, 4 Drawing Sheets

CONTROL SYSTEM FOR PITCHING MACHINE

BACKGROUND

In an arm style pitching machine, a rigid arm is rotated about a central axis by an electric motor. A large spring is compressed as the arm rotates and automatically releases at a set point in the rotation to quickly rotate the arm through the remainder of the rotation. The ball is released once the arm reaches the end of its travel, simulating the mechanics of a professional pitcher. An example of a pitching machine that employs a spring mechanism to propel the ball is generally described is U.S. Pat. No. 3,757,759. Perhaps the most common spring-actuated pitching machine is the IRON MIKE pitching machine marketed by Master Pitching Machine, Inc. of Kansas City, Mo.

There are two advantages to arm style pitching machines that have made them the machine of choice for batting cages and professional baseball teams. The main advantage is that the movement of the throwing arm in these machines is a close approximation of the wind-up of a pitcher, allowing the batter to time their swing based on this visual cue. The other benefit to this machine style is that they are typically built with a simple, robust mechanism that is weatherproof and tough enough for years of service without trouble.

These machines typically include simple manual adjustments for speed of pitch and height of pitch. To adjust the machine, the user turns a hand crank connected to a threaded rod. Twisting the crank causes the threaded rod to extend or retract. Once an adjustment is made a pitch must be observed to confirm that the adjustment has been made accurately. A faster pitch reaches the strike zone faster, giving the pitch less time to drop towards the ground. This means that when the speed of the pitch is changed, the height of the pitch must also be adjusted to bring the ball back into the optimal strike zone.

Height adjustment is made by changing the angle of the throwing arm assembly. This adjustment does not require a great deal of force but can require many turns to change the required angle from slowest to fastest pitch. It can take 60 turns to move the height adjustment through its range of motion and often takes up to 4 minutes.

Speed adjustment is made by altering the pre-wind of a large coil spring that is attached to the pitching arm. The more pre-wind on the spring the faster the pitch. This adjustment requires a great deal of force and is most easily accomplished when the machine is at rest. Once the machine begins loading the spring for a pitch the adjusting mechanism must overcome a far greater force, which quickly becomes hard to accomplish by hand.

Because these adjustments are so rudimentary, the user is inclined to leave the machine in one setting during practice, and it is impossible to adjust the speed and height between pitches in any meaningful way as pitches occur every six seconds.

Real world pitches not only vary in speed and height, but also shift from side-to-side. Current pitching machines have no means of adjusting the pitch horizontally, in fact, they pitch extremely consistently and hold their adjustments well.

U.S. Pat. No. 8,622,049 describes a pitching machine incorporating hydraulic cylinders for adjusting pitch height and speed according to pre-set increments. Hydraulic components, which are heavy and technically difficult for the average user to install and maintain, require the user to monitor the oil level, check for leaks, and replace the oil periodically. The control interface is unintuitive, two different speeds are listed but if either of those speeds is not optimal then the user must have an understanding of the underlying mechanism in order to move stops or limit switches, which can be an overwhelming task if they are not mechanically inclined.

SUMMARY

In view of the foregoing, a control system for controlling a pitch parameter includes a controller, at least one pitch parameter adjustment actuator configured to mount to a pitching machine and cooperate with a component of or operatively connected to an arm assembly to adjust at least one pitch parameter, and at least one position tracking linear scale configured to mount the pitching machine. The at least one pitch parameter adjustment actuator is electrically operated and actuated by the controller. The at least one position tracking linear scale is electrically operated and communicates location data associated with movement of the component to the controller.

A method for attaching a control system to an arm style pitching machine includes fixing at least one pitch parameter adjustment actuator to at least one of an arm assembly and a frame assembly supporting the arm assembly of the pitching machine. The at least one pitch parameter adjustment actuator is configured to move at least a portion of the arm assembly relative to a surface supporting the pitching machine for adjusting at least one pitch parameter. The method further includes connecting the at least one pitch parameter adjustment actuator to an electrical power source and connecting the at least one pitch parameter to a controller. The method also includes fixing at least one position tracking linear scale to the pitching machine. The position tracking linear scale is configured to receive an applied voltage, to detect a voltage and to communicate the detected voltage to the controller.

A more particular example of a control system for a pitching machine having an arm assembly includes a controller, a memory associated with the controller, a remote controlled user interface operatively connected to the controller, a speed adjustment pitch parameter actuator, a first position tracking linear scale assembly, a height adjustment pitch parameter actuator, a second position tracking linear scale assembly, a horizontal adjustment pitch parameter actuator and a third position tracking linear scale assembly. The user interface includes at least one switch and signal light enabling a user to save pitch parameters, select saved pitch parameters, and select random pitch parameters. The speed adjustment pitch parameter actuator is either an electrical linear actuator or a worm gear actuator, and is actuated by the controller and configured to mount the pitching machine and cooperate with the arm assembly to adjust pitch speed. The first position tracking linear scale is configured to mount to the pitching machine and operatively connect with the speed adjustment pitch parameter actuator. The first position tracking linear scale is also configured to detect a position of the speed adjustment pitch parameter actuator as an electrical property and communicate speed adjustment pitch parameter actuator position data to the controller. The height adjustment pitch parameter actuator is an electrical linear actuator, and is actuated by the controller and configured to mount the pitching machine and cooperate with the arm assembly to adjust pitch height. The second position tracking linear scale is configured to mount to the pitching machine and operatively connect with the height adjustment pitch parameter actuator. The second position tracking linear scale is configured to detect a position of the height adjustment pitch parameter actuator as an electrical property and communicate height adjustment pitch parameter actuator position data to the controller. The horizontal adjustment pitch parameter actuator is an electrical linear actuator, and is actuated by the controller and configured to mount the pitching machine and cooperate with the arm assembly to adjust pitch horizontal position. The third position tracking linear scale is configured to mount to the pitching machine and operatively connect with the horizontal adjustment pitch parameter actuator. The third position tracking linear scale is configured to detect a position of the horizontal adjustment pitch parameter actuator as an electrical property and communicate horizontal adjustment pitch parameter actuator position data to the controller.

DETAILED DESCRIPTION

Figure 1:
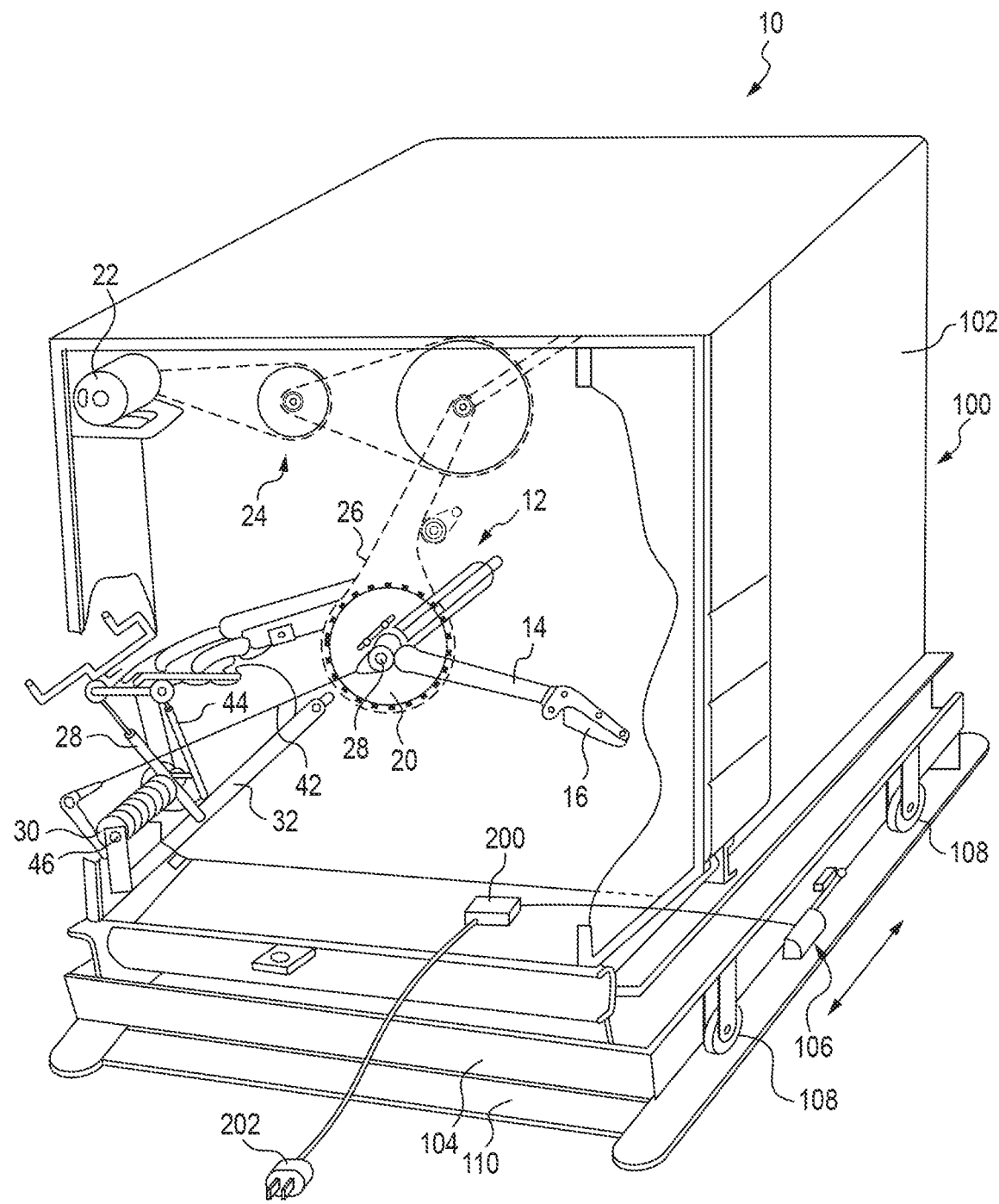
FIG. 1 is a schematic depiction of a pitching machine.

FIG. 1 depicts a pitching machine 10 including an arm assembly 12 for pitching a ball to a batter. The arm assembly 12 includes an arm 14 having a receptacle 16 at a free end of the arm. The receptacle 16, also known in the art as the "hand," holds the ball to be pitched. The arm 14 connects to an arm driving gear 20 that is connected with a motor 22 through a transmission 24 that can include a chain 26. Rotation of the arm driving gear 20 results in rotation of the arm 14 about an arm axis 28.

Figure 2:
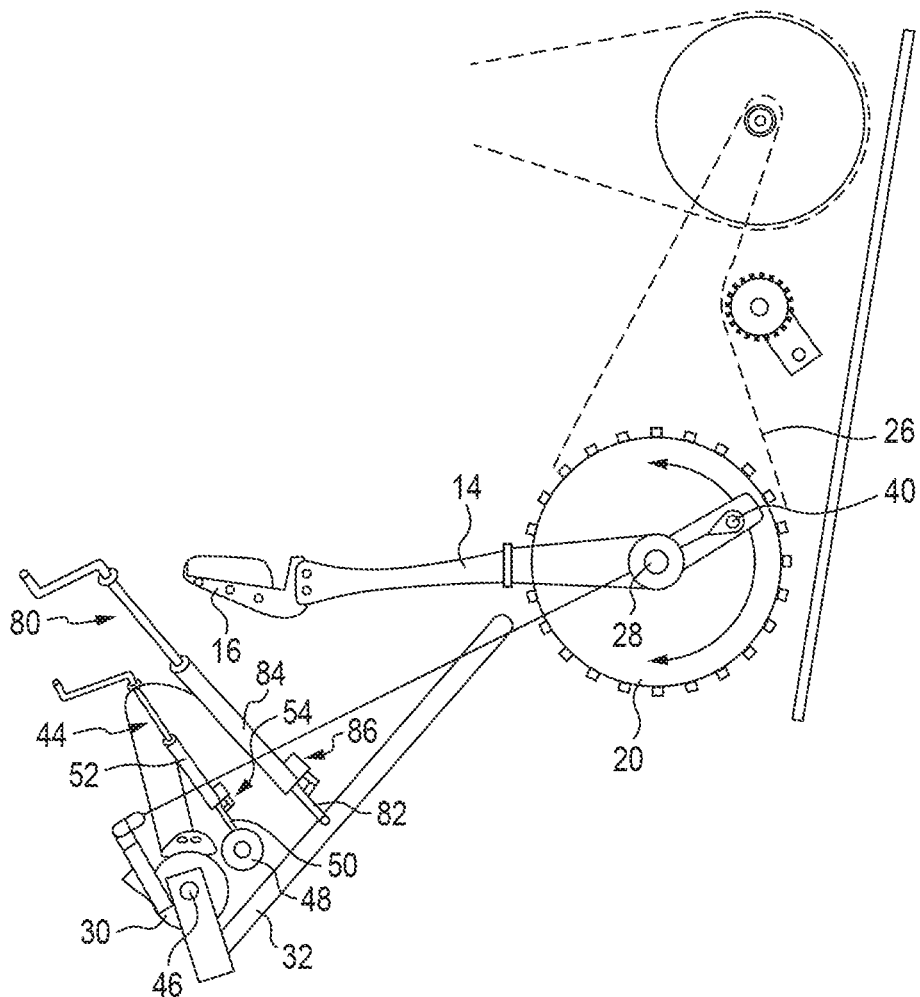
FIG. 2 is a schematic depiction of an arm assembly of the pitching machine.

The arm assembly 12 includes a torsion spring 30 attached to a spring boom 32. With reference to FIG. 2, a spring engaging element 40 is fixed to the arm driving gear 20. The arm 14 connects with the torsion spring 30 through a cable 42 connected with the spring engaging element 40. A speed adjustment rod assembly 44 connects with one end of the torsion spring 30 or a spring axle 46 extending through the torsion spring 30 through a spring connector 48. Shortening a speed adjustment rod assembly 44 compresses the torsion spring 30 by winding the torsion spring 30 along the spring axle 46, which increases the speed of the pitch. Lengthening the speed adjustment rod assembly 44 releases the torsion spring 30, which decreases the speed of the pitch.

With continued reference to FIG. 2, the speed adjustment rod assembly 44 includes a first speed adjustment rod 50, a second speed adjustment rod 52 and a speed adjustment pitch parameter actuator 54. In the illustrated embodiment, the first speed adjustment rod 50 is telescopically received in the second speed adjustment rod 52 such that the first speed adjustment rod 50 is movable with respect to the second speed adjustment rod 52. The speed adjustment pitch parameter actuator 54 connects to both the first speed adjustment rod 50 and the second speed adjustment rod 52 and will be described in more detail below.

The height of the pitch is changed by varying the release point of the receptacle 16. In general, a relatively lower spring boom 32 results in a high pitch, and a relatively higher spring boom 32 results in a lower pitch. The height of the spring boom 32 is adjustable by a height adjustment rod assembly 80 which lengthens or shortens thereby lowering or raising the spring boom 32.

The height adjustment rod assembly 80 includes a first height adjustment rod 82, a second height adjustment rod 84 and a height adjustment pitch parameter actuator 86. In the illustrated embodiment, the first height adjustment rod 82 is telescopically received in the second height adjustment rod 84 such that the first height adjustment rod 82 is movable with respect to the second height adjustment rod 84. The height adjustment pitch parameter actuator 86 connects to both the first height adjustment rod 82 and the second height adjustment rod 84 and will be described in more detail below.

With reference back to FIG. 1, the horizontal location of the pitch is also changed by varying the release point of the receptacle 16. In the illustrated embodiment, this is accomplished by moving an upper frame assembly 100 with respect to the ground or other surface supporting the pitching machine 10. The upper frame assembly 100 can include an enclosure 102 that encloses the arm assembly 12 and other components of the pitching machine 10. The upper frame assembly 100 can also include a lower frame subassembly 104 and wheels 108 attached to the lower frame subassembly 104. Two wheels 108 are visible in FIG. 1. Two more wheels can be provide on an opposite side of the rectangular lower frame subassembly 104. The arm assembly 12 is supported on the lower frame subassembly 104.

The pitching machine 10 can also include a base frame member 110 that may be attached to the ground in a removable or fixed fashion. A horizontal adjustment pitch parameter actuator 106 connects to both the lower frame subassembly 104 and the base frame member 110 and will be described in more detail below.

Figure 3:
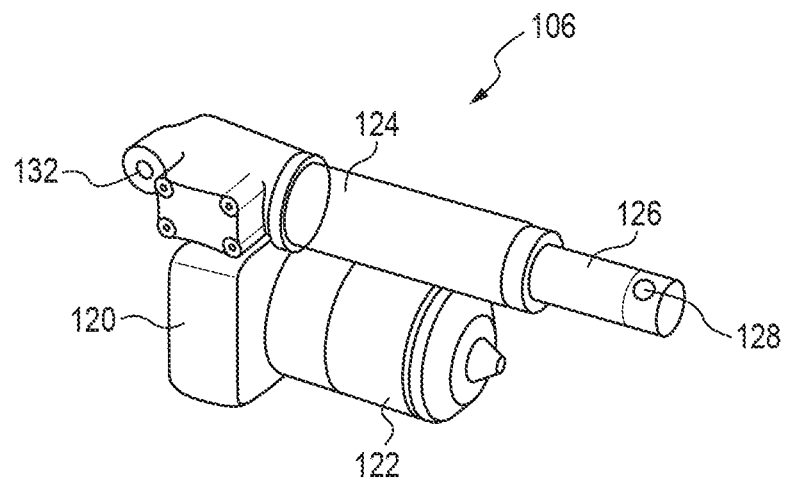
FIG. 3 is a perspective view of an electrical linear actuator for adjusting pitching parameters of the pitching machine.
Figure 4:
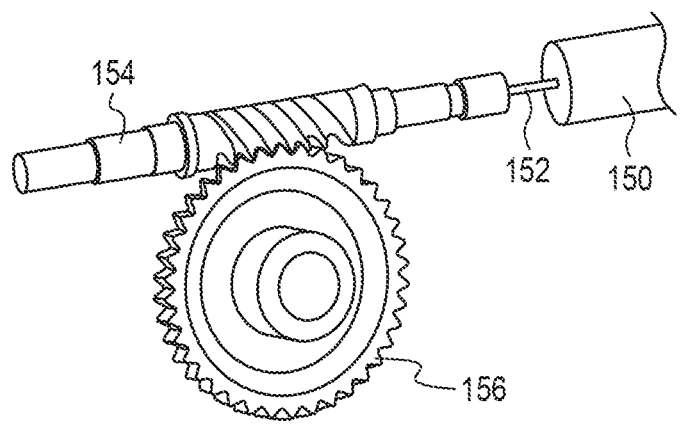
FIG. 4 is a perspective view of a worm gear actuator for adjusting pitching parameters of the pitching machine.

Each of the pitch parameter actuators 54, 86 and 106 can be an electronic linear actuator. The horizontal adjustment pitch parameter actuator 106 will be described in detail with reference to FIG. 3 with the understanding that the speed adjustment pitch parameter actuator 54 and the height adjustment pitch parameter actuator 86 can be identical. The horizontal adjustment pitch parameter actuator 106 illustrated in FIG. 3 is an electric linear actuator including a speed reduction mechanism housing 120, an electric motor 122, a speed reduction mechanism (not visible but housed in the speed reduction mechanism), and a screw mechanism (not visible) housed in a screw mechanism housing 124. The electric motor 122 is mounted to the speed reduction mechanism housing 120. The speed reduction mechanism is configured to reduce the rotational speed of the electric motor 122 when engaged with a motor shaft (not visible) of the electric motor 122. The screw mechanism housed in the screw mechanism housing 124 converts the rotational motion of the electric motor 122 to an axial linear motion of a drive shaft 126 via the speed reduction mechanism. A free end of the drive shaft 126 includes a first connector element 128 that can connect with the lower frame subassembly 104 (FIG. 1). A second connector element 132 extends from the speed reduction mechanism housing 120 or the screw mechanism housing 124 and can connect with the base frame member 110 (FIG. 1). When the electric motor 122 is operating, the first connector element 128 moves with respect to the second connector element 132. Accordingly, when the electric motor 122 is operating, the lower frame subassembly 104 moves with respect to the base frame member 110.

As for the speed adjustment pitch parameter actuator 54, the first connector element 128 can connect with the first speed adjustment rod 50 and the second connector element 132 can connect with the second speed adjustment rod 52 to move the first speed adjustment rod 50 with respect to the second speed adjustment rod 52. As for the height adjustment pitch parameter actuator 86, the first connector element 128 can connect with the first height adjustment rod 82 and the second connector element 132 can connect with the second height adjustment rod 84 to move the first height adjustment rod 82 with respect to the second height adjustment rod 84.

If desired, the speed adjustment pitch parameter actuator 54 can be a worm gear actuator. The speed adjustment pitch parameter actuator 54 as a worm gear actuator includes an electric motor 150 having its motor shaft 152 connected with a worm 154. The worm 154 engages with a worm gear 156, which can be connected with the spring axle 46 (FIG. 1) such that rotation of the worm gear 156 either tightens or loosens the torsion spring 30.

Figure 5:
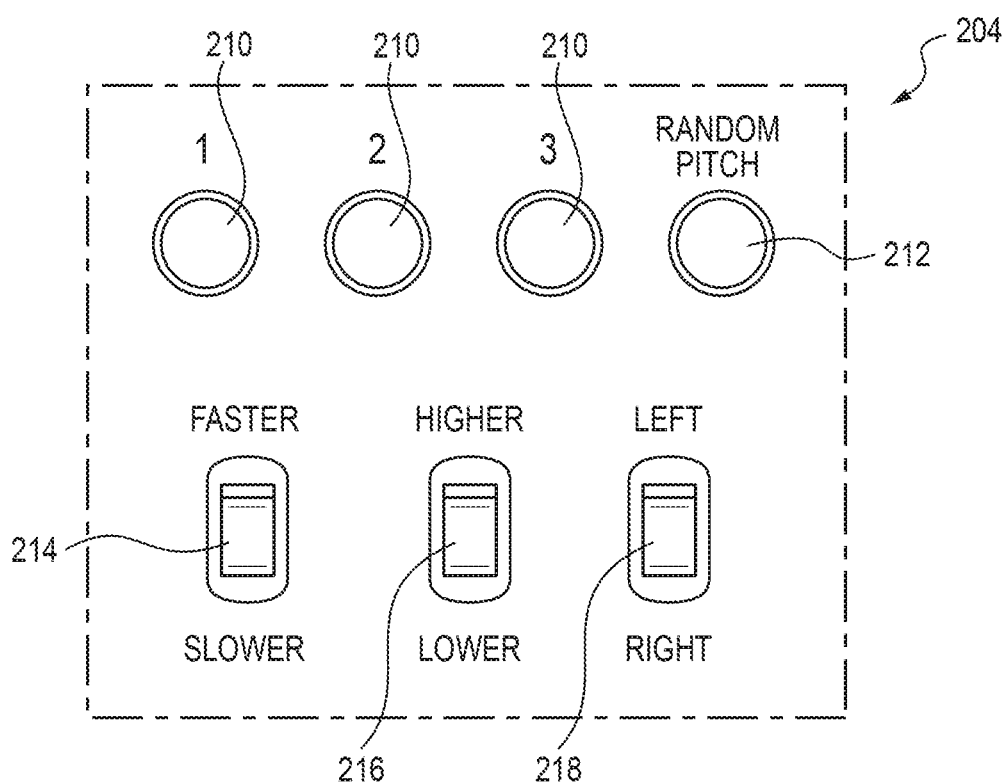
FIG. 5 is a schematic depiction of a user interface of the pitching machine.

With reference back to FIG. 1, each of the pitch parameter actuators 54, 86 and 106 is electrically connected with a controller 200. The controller 200 receives power from a power source via a plug 202 in the illustrated embodiment. The controller 200 is also electrically connected with a user interface 204 (FIG. 5). The user interface 204 may be fixed to the pitching machine 10, located remotely from the pitching machine 10 near the batter, or located away from the pitching machine 10 and batter such that another person could control the pitching machine 10 without the batter knowing what settings have been made. The operative connection between the user interface 204 and the controller 200 may be facilitated by a wired connection or by wireless signal through the inclusion of a wireless antenna. The controller 200 may also include or be in communication with a memory.

With reference to FIG. 5, the user interface 204 includes a plurality of memory buttons 210 and a random pitch button 212 to allow an operator to control pitch parameters, i.e., speed, height and horizontal alignment. The user interface 204 also includes a speed adjustment toggle switch 214, a vertical adjustment toggle switch 216 and a horizontal adjustment toggle switch 218 to control the pitch parameters.

The controller 200 and the user interface 204 are configured such that user adjusts speed, pitch height and horizontal position of the pitch with the corresponding toggle switches 214, 216, 218. Once the pitch parameters are set to the users liking, the user can save the pitch parameters to one of plurality of programmable settings by pressing and holding a desired memory button 210 until a light behind the respective button blinks, for example. To recall a desired setting, the user presses a desired memory button among the plurality of memory buttons 210. Once the desired button is released, the controller 200 determines the current pitch parameters and applies power appropriately until the target positions are reached for the respective pitch parameter actuators 54, 86 and 106. Preset pitch parameters can be selected repeatedly and with very little effort on the user's part. Through the use of pitch parameter actuators 54, 86 and 106 that are electronic linear actuators, adjustments are made quickly and accurately, well within the time between successive pitches, e.g., about six seconds. If the user depresses the random pitch button 212, the controller 200 is configured such that the pitching machine 10 first waits for a pitch to complete, then chooses from the saved memory locations at random between each pitch. This functionality allows users to very quickly approach the pitching machine 10, save their desired settings and practice however they like, either choosing to repeatedly practice on one setting, and then quickly move to another for continued repeated practicing, or to have the pitching machine 10 randomly alternate between stored pitch parameters.

The user interface 204 could also be in the form of mobile phone application. The mobile phone application can operate in a similar manner to the user interface described above and include similar buttons. The controller 200 can be configured to wirelessly connect with the mobile phone application, via Bluetooth® technology, for example.

Figure 6:
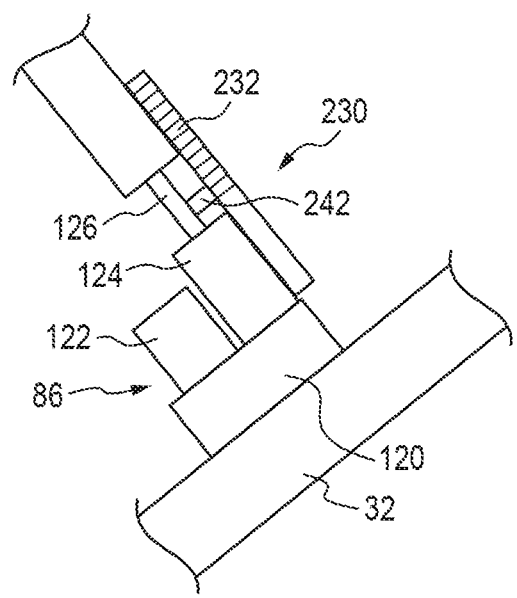
FIG. 6 is a schematic depiction of a position tracking linear scale of the pitching machine.

For the controller 200 to make accurate adjustments it must be able to read the current position of each pitch parameter actuator 54, 86 and 106 so that the controller 200 can determine in which direction to move the respective pitch parameter actuators 54, 86 and 106. The controller 200 must also be able to detect when the new target position has been reached. FIG. 6 shows an example of a position tracking linear scale 230, which will be described in more detail below. When the pitching machine 10 is powered on, the controller 200 can detect the location of every pitch parameter actuator 54, 86 and 106 and there is no need to move to a starting state. Since all positioning is based on the readings from the electric position tracking linear scales, this avoids unnecessary movements and allows a wider range of motors to be used to power movement, because the precise incremental movement of the motor is not necessary.

In the illustrated embodiment, the position tracking linear scale 230 functions using variable resistors. A scale 232 is mounted rigidly to a component of the pitching machine 10, which could be, for example, the screw mechanism housing 124 of the electrical linear actuator. A reading head 242 moves along the scale 232. For example, the reading head 242 is mounted rigidly to the drive shaft 126 electrical linear actuator. A known voltage is supplied to the scale 232, which can be 5 volts, via the controller 200. As the reading head 242 travels across the scale 232, the reading head 242 reads from 0 to 5 volts, depending on which end of the scale 232 the reading head 242 is closest. The controller 200 is configured to determine the drive shaft 126 based on the voltage reading. This voltage reading can be converted into a value that can be saved to the memory.

FIG. 6 shows adjustment of the spring boom 32 via the height adjustment pitch parameter actuator 86. The position tracking linear scale 230 can be provided as part of or assembled with the electric linear actuator depicted in FIG. 3. This allows for fixing the position tracking linear scale 230 to the pitching machine 10 while fixing each pitch parameter adjustment actuator 54, 86 and 106 to the pitching machine 10. The speed adjustment pitch parameter actuator 54 and the horizontal adjustment pitch parameter actuator 106 could also cooperate with or include such a position tracking linear scale 230. This allows for the controller 200 to determine the location of the drive shaft 126 for the speed adjustment pitch parameter actuator 54 and the horizontal adjustment pitch parameter actuator 106 and/or each component moved by the speed adjustment pitch parameter actuator 54 and the horizontal adjustment pitch parameter actuator 106.

This system described above includes multiple pitch parameter adjustment actuators 54, 86 and 106 with built in position tracking and a controller. The system can be easily installed in place of the manual adjustments by a user with basic hand tools, enabling them to convert an existing pitching machine so that is much easier to adjust and much more capable. The system could also be easily built into new equipment direct from the manufacturer.

The embodiment of the control system described above shows pitch parameter adjustment actuators 54, 86 and 106 mounted in particular locations and moving particular components of the pitching machine 10. The pitch parameter adjustment actuators 54, 86 and 106 can be mounted elsewhere as long as each pitch parameter adjustment actuator 54, 86 and 106 cooperates with a respective component of or operatively connected to the arm assembly 12 to adjust at least one pitch parameter, i.e., speed, height or horizontal location. Likewise, each position tracking linear scale 230 can be mounted elsewhere so long as it is electrically operated and communicates location data associated with movement of the component to the controller 200.

It should be appreciated that the invention is not limited to only the embodiments described above, but that the invention is defined by the appended claims and various presently unforeseen or unanticipated alternatives, modifications, variations or improvements therein may be subsequently made by those skilled in the art which are also intended to be encompassed by the following claims.

The invention claimed is:

1. A control system for controlling a pitch parameter, the system comprising:
   a controller;
   at least one pitch parameter adjustment actuator configured to mount a pitching machine and cooperate with a component of or operatively connected to an arm assembly to adjust at least one pitch parameter, wherein the at least one pitch parameter adjustment actuator is electrically operated and actuated by the controller; and
   at least one position tracking linear scale configured to mount the pitching machine, the at least one position tracking linear scale is electrically operated and communicates location data associated with movement of the component to the controller.

2. The control system of claim 1, wherein the at least one pitch parameter adjustment actuator includes at least one of a first pitch parameter adjustment actuator for adjusting pitch speed, a second pitch parameter adjustment actuator for adjusting pitch height, and a third pitch parameter adjustment actuator for adjusting horizontal pitch position.

3. The control system of claim 2, wherein at least one pitch parameter adjustment actuator is an electrical linear actuator.

4. The control system of claim 2, wherein first pitch parameter adjustment actuator is a worm gear actuator including an electric motor.

5. The control system of claim 1, wherein the at least one position tracking linear scale is configured to detect the location data based on a voltage read by a reading head.

6. The control system of claim 1, wherein the at least one position tracking linear scale is mounted to the at least one pitch parameter adjustment actuator for attachment to the pitching machine as an assembly.

7. The control system of claim 1, wherein the at least one pitch parameter adjustment actuator includes an electric motor, a housing and a drive shaft movable with respect to the housing and the at least one position tracking linear scale includes a scale mounted to the housing and a reading head operatively connected with the drive shaft.

8. The control system of claim 1, further comprising a user interface in electrical communication with the controller and a memory associated with the controller, the user interface comprising at least one switch configured for signaling the controller to save user selected pitch parameters to the memory.

9. The control system of claim 1, further comprising a user interface in electrical communication with the controller and a memory associated with the controller, the user interface comprising at least one switch configured for signaling the controller to select pitch parameters saved in the memory.

10. The control system of claim 1, wherein the controller is configured to determine an initial position of the component based on at least one voltage reading received from the at least one position tracking linear scale.

11. The control system of claim 10, further comprising a user interface in electrical communication with the controller, the user interface includes at least one switch configured for signaling the controller to move the component among a plurality of positions.

12. The control system of claim 11, wherein the user interface includes at least one switch configured for signaling the controller to save a desired position of the component in a memory.

13. The control system of claim 12, wherein the controller is configured to move the component to the desired position when activated again after signaling the controller to save the desired position of the component in the memory.

14. The control system of claim 1, further comprising a user interface in electrical communication with the controller and a memory associated with the controller, the user interface being a mobile phone application.

* * * * *